United States Patent
Lin et al.

(10) Patent No.: US 10,622,778 B2
(45) Date of Patent: Apr. 14, 2020

(54) HIGH-POWER FIBER CLADDING POWER STRIPPER

(71) Applicant: NATIONAL CHUNG SHAN INSTITUTE OF SCIENCE AND TECHNOLOGY, Taoyuan (TW)

(72) Inventors: Jian-Hung Lin, Taoyuan (TW); Po-Tse Tai, Taoyuan (TW); Wei-Chung Yen, Taoyuan (TW)

(73) Assignee: NATIONAL CHUNG SHAN INSTITUTE OF SCIENCE AND TECHNOLGY, Taoyuan (TW)

( * ) Notice: Subject to any disclaimer, the term of this patent is extended or adjusted under 35 U.S.C. 154(b) by 353 days.

(21) Appl. No.: 15/479,652

(22) Filed: Apr. 5, 2017

(65) Prior Publication Data
US 2018/0294616 A1    Oct. 11, 2018

(51) Int. Cl.
G02B 6/02 (2006.01)
G02B 6/44 (2006.01)
H01S 3/067 (2006.01)
H01S 3/094 (2006.01)

(52) U.S. Cl.
CPC ........ *H01S 3/0675* (2013.01); *G02B 6/02095* (2013.01); *G02B 6/02395* (2013.01); *G02B 6/4417* (2013.01); *H01S 3/094007* (2013.01); *H01S 3/06729* (2013.01)

(58) Field of Classification Search
CPC .......... G02B 6/02095; G02B 6/022395; G02B 6/02395; G02B 6/02057; G02B 6/02076; G02B 6/021; H01S 3/0675
See application file for complete search history.

(56) References Cited

U.S. PATENT DOCUMENTS

| | | | | |
|---|---|---|---|---|
| 5,881,197 A * | 3/1999 | Dong | ................. | G02B 6/02114 385/127 |
| 5,982,962 A * | 11/1999 | Koops | ................. | G02B 6/02057 385/37 |
| 6,360,038 B1 * | 3/2002 | Grubsky | ................. | G02B 6/021 385/27 |
| 6,411,755 B1 * | 6/2002 | Erdogan | ............ | G02B 6/02095 385/28 |
| 6,415,079 B1 * | 7/2002 | Burdge | ............... | C03B 37/0122 385/37 |

(Continued)

OTHER PUBLICATIONS

Baek et al. "A cladding-pumped fiber laser with pump-reflecting inner-cladding Bragg grating", IEEE Photonics Technology Letters, vol. 16, No. 2, pp. 407-409. (Year: 2004).*

*Primary Examiner* — Eric L Bolda
(74) *Attorney, Agent, or Firm* — WPAT, PC

(57) ABSTRACT

A high-power fiber cladding power stripper comprises a core unit, a cladding layer, a grating structure, and a jacket. The core unit is an optical conductive material. The cladding layer is disposed outside the core unit, wherein a refractive index of the cladding layer is lower than that of the core unit. The grating structure, disposed outside the cladding layer, is for producing diffraction effects. The jacket surrounds and protects the core unit, the cladding layer, and the grating structure. Hence, in a high-power fiber laser system, the cladding power stripper can be utilized for removing residual pump energy before the laser light entering an output collimator.

11 Claims, 7 Drawing Sheets

(56) References Cited

U.S. PATENT DOCUMENTS

| | | | |
|---|---|---|---|
| 2004/0036955 A1* | 2/2004 | Digonnet | G02B 6/03638 |
| | | | 359/341.1 |
| 2004/0161196 A1* | 8/2004 | Murashima | G02B 6/02138 |
| | | | 385/37 |
| 2006/0093012 A1* | 5/2006 | Singh | G02B 6/02085 |
| | | | 372/102 |
| 2006/0140559 A1* | 6/2006 | Tsuda | G02B 6/02095 |
| | | | 385/123 |
| 2011/0267612 A1* | 11/2011 | Roberts | G02B 6/021 |
| | | | 356/301 |
| 2014/0085626 A1* | 3/2014 | Wei | G02B 6/34 |
| | | | 356/73.1 |
| 2015/0362684 A1* | 12/2015 | Seo | G02B 6/4296 |
| | | | 385/31 |

* cited by examiner

HIGH-POWER FIBER CLADDING POWER STRIPPER

FIELD OF THE INVENTION

The present invention relates to is related to an apparatus for removing residual light energy, and in particular to an apparatus for removing residual light energy, based on diffraction effects.

BACKGROUND OF THE INVENTION

Optical fibers are a kind of signal transmission means based on the principle of full reflection. Optical fibers are inexpensive because the main raw material of optical fibers is silicon, the reserves of which are large in the surface of the Earth. Optical fibers have been widely utilized in society for applications such as communications, and also significantly used in the field of medicine and entertainment.

High-power fiber lasers are a kind of small-sized laser systems, with the advantages of being easy to carry and set up, high electro-optical conversion efficiency, good beam quality, and being easy to dissipate heat, and so on. High-power fiber lasers have been widely utilized in applications such as cutting, welding, drilling, surface treatment, etc., and are the fastest growing laser products in recent years. However, unwanted residual pump energy generally exists before the laser light enters the laser source output (i.e., output collimator) of the high-power fiber laser. The residual pump energy, if not removed, will directly degrade the beam quality of the laser source that is outputted. The degraded beam quality and abundant heat load may cause damage to the output collimator; and even worse, the entire laser system would be destroyed because the residual laser light reflected by the output collimator is fed back to the laser system.

The conventional solutions to the above problems include a high refractive index coating (glue) method. In general, a passive double cladding layer fiber structure is composed of a fiber core, an inner cladding layer, and an outer cladding layer. The high refractive index coating (glue) method is to apply a polymer glue material, having a refractive index equal or greater than that of the material of the inner cladding layer, to the surface of the inner cladding layer. The working principle of this method is to direct the residual pump lights within the cladding layer out of the inner cladding layer by applying the optical refraction and scattering effects; to convert the light into heat by absorption through glue material and thermal packaging mechanism design; and finally to dissipate the heat by applying air-cooling or water-cooling, thus achieving the purpose to remove residual cladding energy. However, the residual scattering light directed by this method may cause temperature increase of the polymer glue material. General polymer glue material can withstand the temperature up to 90 to 100° C., and will burn when the temperature is greater than 150° C. Hence, this method can be applied to residual pump light energy of about 100 W, but does not apply to multi-kilowatt fiber laser systems.

Therefore, the industry is currently in great need to develop a cladding power stripper for high-power fiber, with the heat dissipation mechanism of good thermal efficiency to eliminate the unwanted residual pump energy before the laser light entering the output collimator of the high-power laser. It is desirable to achieve both the quality and efficiency of the laser light, and to avoid the destruction of the entire laser system due to the residual laser light reflected by the output collimator.

SUMMARY OF THE INVENTION

Accordingly, an object of the invention is to provide a high-power fiber cladding power stripper, comprising a core unit, a cladding layer, a grating structure, and a jacket, to effectively control light energy and to avoid the destruction of the entire laser system due to the residual laser light reflected by the output collimator, so as to acquire a laser beam of high quality.

According to the above object, a high-power fiber cladding power stripper is provided, comprising: a core unit, a cladding layer, a grating structure, and a jacket. The core unit is an optical conductive material. The cladding layer is disposed outside the core unit, wherein a refractive index of the cladding layer is lower than that of the core unit. The grating structure, disposed outside the cladding layer, is for producing diffraction effects. The jacket surrounds and protects the core unit, the cladding layer, and the grating structure.

In some embodiments of the invention, the grating structure is manufactured by using one of a photomask lithography method, dual beam interference technique, and direct laser writing technique.

In an embodiment of the invention, the grating structure is a non-periodic grating structure.

In some embodiments of the invention, the grating structure is a periodic grating structure or a periodically gradual grating structure.

In some embodiments of the invention, the periodic grating structure or the periodically gradual grating structure has a period in a range of 0.5 μm to 3 μm.

In some embodiments of the invention, the grating structure has a duty cycle in a range of 5% to 95%.

In some embodiments of the invention, the grating structure has a height in a range of 0.5 μm to 200 μm.

In some embodiments of the invention, the grating structure has a refractive index in a range of 1.3 to 1.7.

In an embodiment of the invention, the core unit comprises a glass of a high refractive index.

In an embodiment of the invention, the cladding layer comprises a material with a refractive index lower than that of the core unit.

In an embodiment of the invention, the grating structure is in a sinusoidal form, at least in part.

In an embodiment of the invention, the grating structure is in a square form, at least in part.

In an embodiment of the invention, the grating structure is a random form, at least in part.

In an embodiment of the invention, the grating structure comprises a plurality of grating sections arranged adjacent to each other along the cladding layer.

In an embodiment of the invention, the grating structure comprises a plurality of grating sections spaced apart along the cladding layer.

DETAILED DESCRIPTION OF THE PREFERRED EMBODIMENTS

To make it easier for understanding of the object, aspects, and effects according to this invention, embodiments are provided together with the attached drawings for the detailed description of the invention.

According to the invention, a grating structure can be implemented on the surface of a fiber inner cladding layer to further process residual pump light energy, based on diffraction effect of grating, in comparison with conventional technique. In a structure according to the invention, a periodic or non-periodic grating structure can be disposed on the surface of a fiber inner cladding layer to direct residual pump light energy, based on diffraction effect. The directed residual pump light energy can be then applied to a heat dissipation mechanism so as to strip the residual pump light energy. In addition, in an embodiment, the residual pump light energy can be effectively and uniformly dispersed by the control of diffraction efficiency of the grating structure in a gradual manner, and the dispersed energy can be controlled under the range of power to be withstood by the material of the micro-nanometer grating structure. Hence, the problem of the material which withstands limited power in the high refractive index coating method that the material can be resolved.

Figure 1:
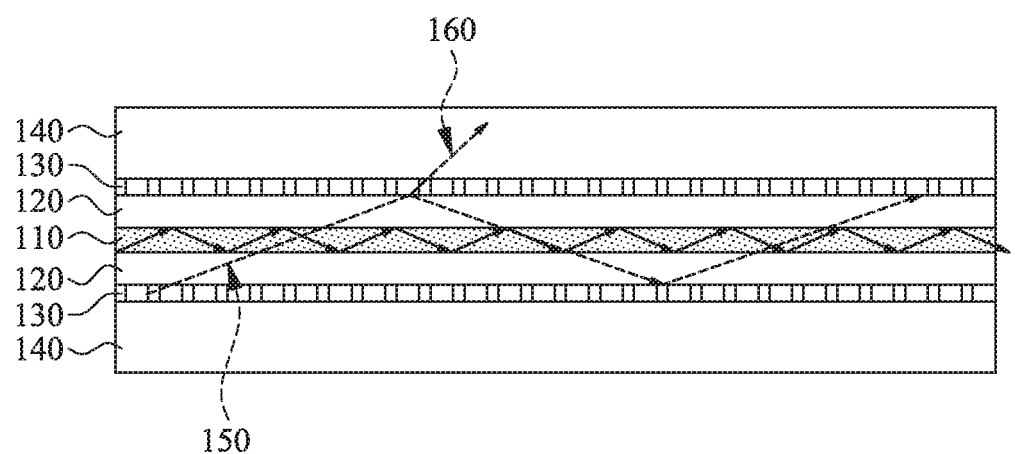
FIG. 1 is a schematic diagram illustrating a high-power fiber cladding power stripper according to an embodiment of the invention.

Referring to FIG. 1, a high-power fiber cladding power stripper according to an embodiment of the invention is illustrated in a schematic diagram. As illustrated in FIG. 1 in a cross-sectional view, a high-power fiber cladding power stripper includes: a core unit 110, a cladding layer 120, a grating structure 130, and a jacket 140. The core unit 110 comprises an optical conductive material, which is, for example, made of a glass of a high refractive index. The cladding layer 120 is disposed outside the core unit 110; and the cladding layer 120 has a refractive index less than the refractive index of the core unit 110. The grating structure 130, disposed outside the cladding layer 120, is for producing diffraction effects. The jacket 140 surrounds the core unit 110, the cladding layer 120, and the grating structure 130, so as to provide protection therefor. When pump energy is applied to the fiber, abundant pump energy 150 is transmitted in the cladding layer 120. When the pump energy is incident to the grating structure 130, the abundant pump energy 150 is directed out of the grating structure 130 due to diffraction effects, thereby removing abundant cladding layer pump energy.

In some embodiment, the grating structure 130 can be one of a periodic grating structure, a non-periodic grating structure, a gradual grating structure, a periodic gradual grating structure, and a step-wise grating structure; or any combination thereof.

In some embodiments, the periodic grating structure or the periodically gradual grating structure has a period in a range of 0.5 µm to 3 µm. In some embodiments, the grating structure has a duty cycle in a range of 5% to 95%. In some embodiments, the grating structure has a height in a range of 0.5 µm to 200 µm. In some embodiments, the grating structure has a refractive index in a range of 1.3 to 1.7. However, the invention is not limited thereto; for example, any combination of above parameters or other values of parameters out of the range(s), when appropriate, can be adopted for implementation according to the invention.

Figure 2:
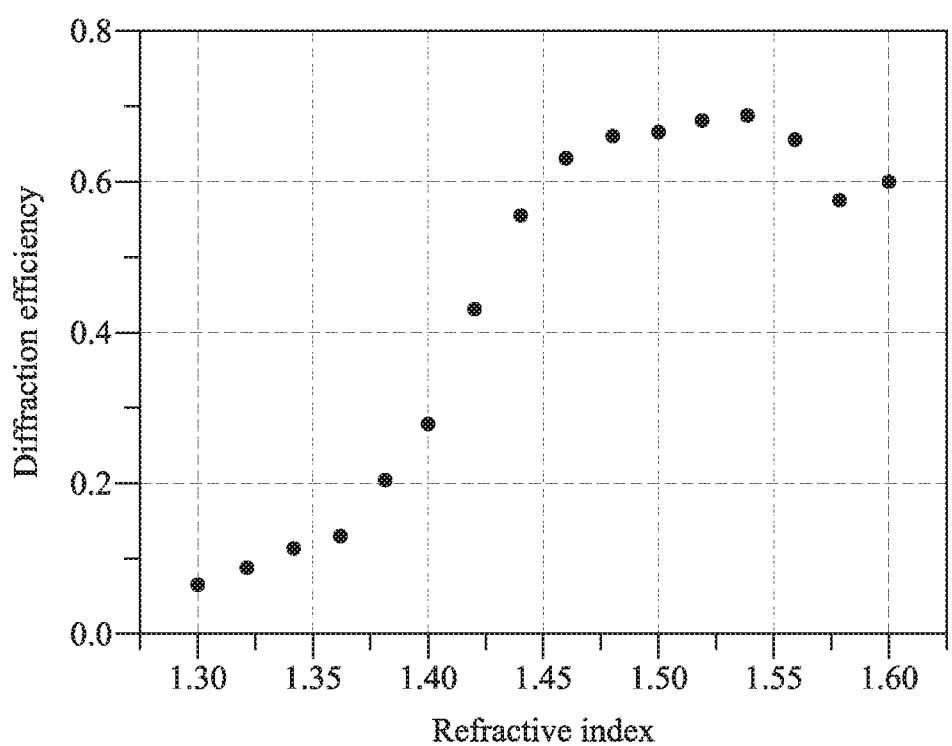
FIG. 2 is a diagram showing diffraction efficiency versus refractive index with respect to a periodic grating structure of the high-power fiber cladding power stripper according to an embodiment of the invention.

In one embodiment, the high power fiber cladding power stripper has a grating structure 130 which is periodic and disposed on the surface of a fiber inner cladding layer (i.e., a cladding layer 120), as illustrated in FIG. 1. In addition, the high power fiber cladding power stripper includes a core unit 110, a cladding layer 120, and a jacket 140 with: their diameters of 20 µm, 400 µm, and 550 µm, respectively; refractive indexes of 1.447, 1.446, and 1.371, respectively; and numerical aperture of 0.06 and 0.46 for the core unit 110 and the cladding layer 120, respectively. In this embodiment, the grating structure 130 has the following parameters: a period of 1.1 µm, a duty cycle of 50%, a structure depth of 13 µm, and a refractive index in a range of 1.3 to 1.6. Referring to FIG. 2, a diagram shows diffraction efficiency versus refractive index with respect to the periodic grating structure of the high-power fiber cladding power stripper of this embodiment. It is found that diffraction efficiency occurs when the refractive index of the periodic grating structure 130 is greater than the refractive index of the jacket 140; a maximum diffraction efficiency of about 68.5% occurs as the refractive index is 1.54, as shown in FIG. 2. In addition, in this embodiment, the duty cycle is defined by a width of a column of the grating structure over an interval of the grating structure. However, the invention is not limited thereto.

Figure 3A:
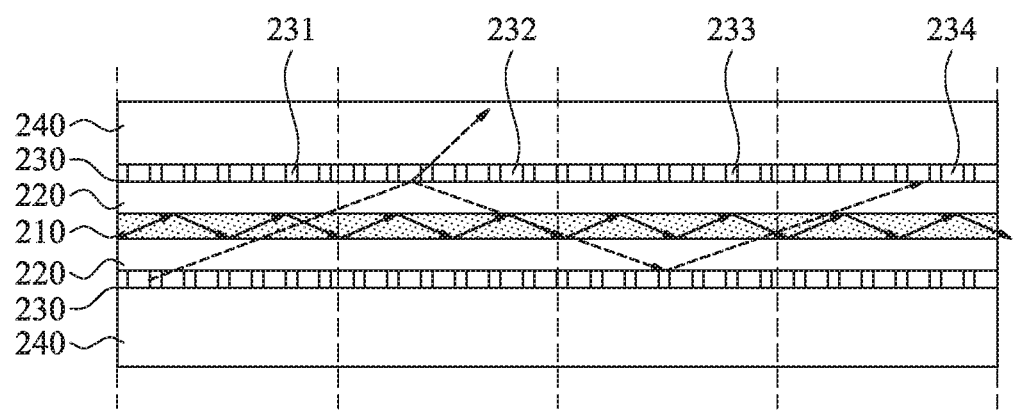
FIG. 3A is a schematic diagram illustrating a high-power fiber cladding power stripper according to another embodiment of the invention.

In some embodiments, the grating structure can be a periodically gradual grating structure. Referring to FIG. 3A, a high-power fiber cladding power stripper in a gradual manner is illustrated according to an embodiment of the invention. As shown in FIG. 3A, in this embodiment, a high-power fiber cladding power stripper is constructed based on a periodic grating structure with gradual refractive indexes, from lower diffraction efficiency to higher diffraction efficiency, or vice versa. In FIG. 3A, the high-power fiber cladding power stripper includes a core unit 210, a cladding layer 220, a grating structure 230, and a jacket 240. The grating structure 230 includes a plurality of grating sections, for example, 231-234. In this embodiment, the grating sections 231-234, arranged adjacent to each other along the cladding layer 220, are periodic gratings with their respective refractive indexes.

Figure 3B:
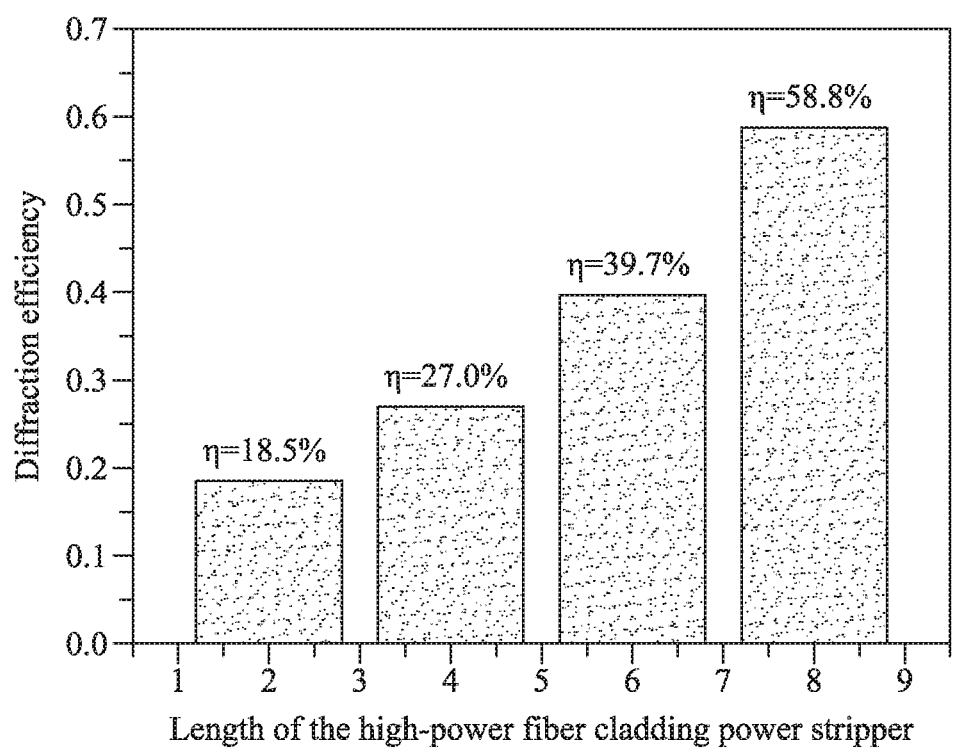
FIG. 3B is a chart illustrating an example of diffraction efficiency of the high-power fiber cladding power stripper as shown in FIG. 3A.

Referring to FIG. 3B, an example of diffraction efficiency of the high-power fiber cladding power stripper of FIG. 3A is illustrated. For example, four grating sections (e.g., 231-234) are employed with each section of 2 cm in length; the first to the fourth sections (e.g., 231-234) have their refractive indexes of 1.37, 1.40, 1.43, and 1.53, respectively, and have diffraction efficiency, after calculation, of 18.5%, 27.0%, 39.7%, and 58.8%, respectively. If a cladding layer power of 400 W exists, the first to the fourth sections (e.g., 231-234) can strip the power of 74.0 W, 88.0 W, 94.4 W, and 84.4 W, respectively; that is, the total power stripped is up to 340.8 W, with the residual power of 59.2 W. Thus, stripping power in a uniformly dispersed manner can be achieved by this example, with each section capable of stripping power within 100 W, for example.

Further, the residual power can be stripped by an output collimator, in general, or by using a clapping power stripping component with a high refractive index. In an embodiment, a high-power fiber cladding power stripper, such as the one shown in FIG. 1 or 3, may further include a clapping power stripping component, such as a coating or glue material, with a high refractive index, covering the jacket 140, for further converting lights directed by the grating structure 130 into heat. In another embodiment, a high-power fiber cladding power stripper, such as the one shown in FIG. 1 or 3, may further include a heat dissipation mechanism, e.g., any thermal conductive material such as metal and so on, so as to dissipate the heat. However, the invention is not limited to these embodiments.

Figure 4A:
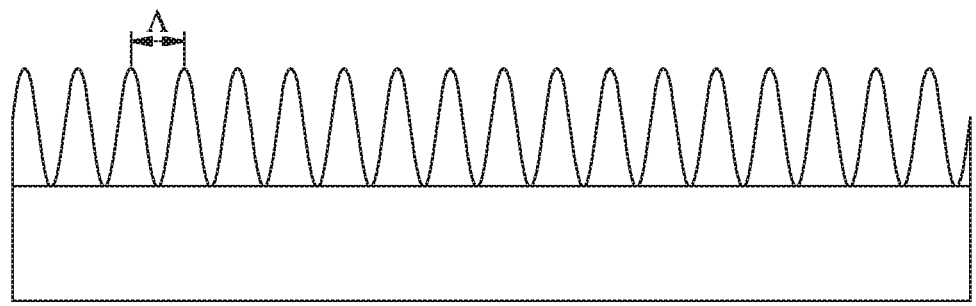
FIGS. 4A to 4E illustrate some embodiments of grating structure according to the invention in cross-sectional views.
Figure 4B:
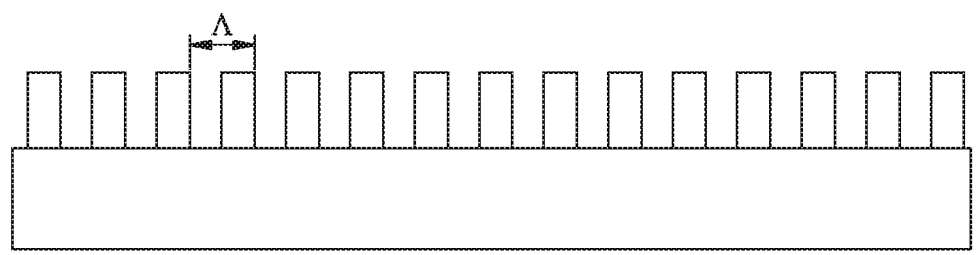
Figure 4C:
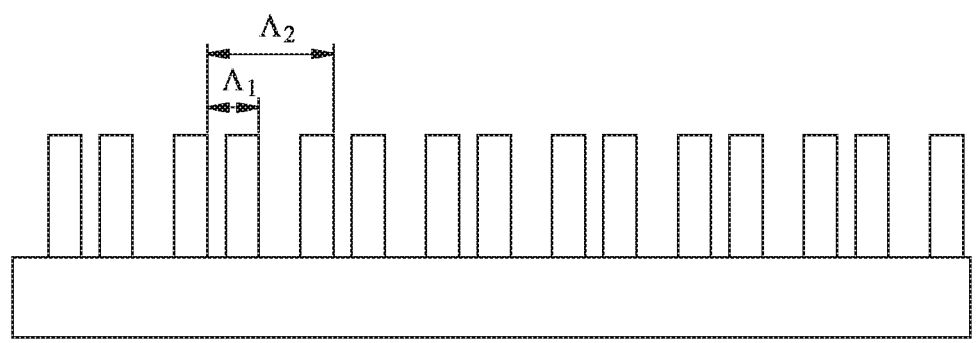
Figure 4D:
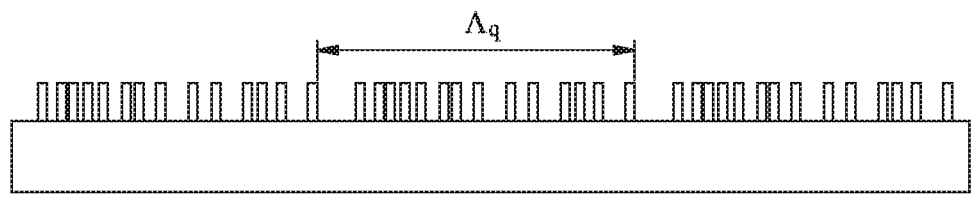
Figure 4E:
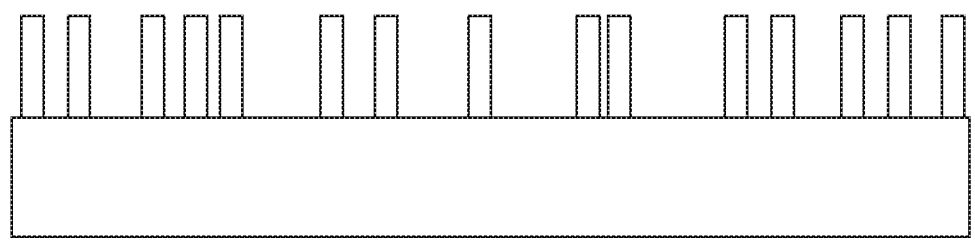

FIGS. 4A to 4E illustrate some embodiments of grating structure according to the invention in cross-sectional views. In FIG. 4A, a grating structure is shown in a sinusoidal form with a period of Λ. In FIG. 4B, a grating structure is shown in a square form with a period of Λ. In FIG. 4C, a grating structure is shown in a square form with dual periods of Λ1 and Λ2. In FIG. 4D, a grating structure is shown with a quasi period of Λq. In FIG. 4E, a grating structure is shown in a random form.

Figure 5:
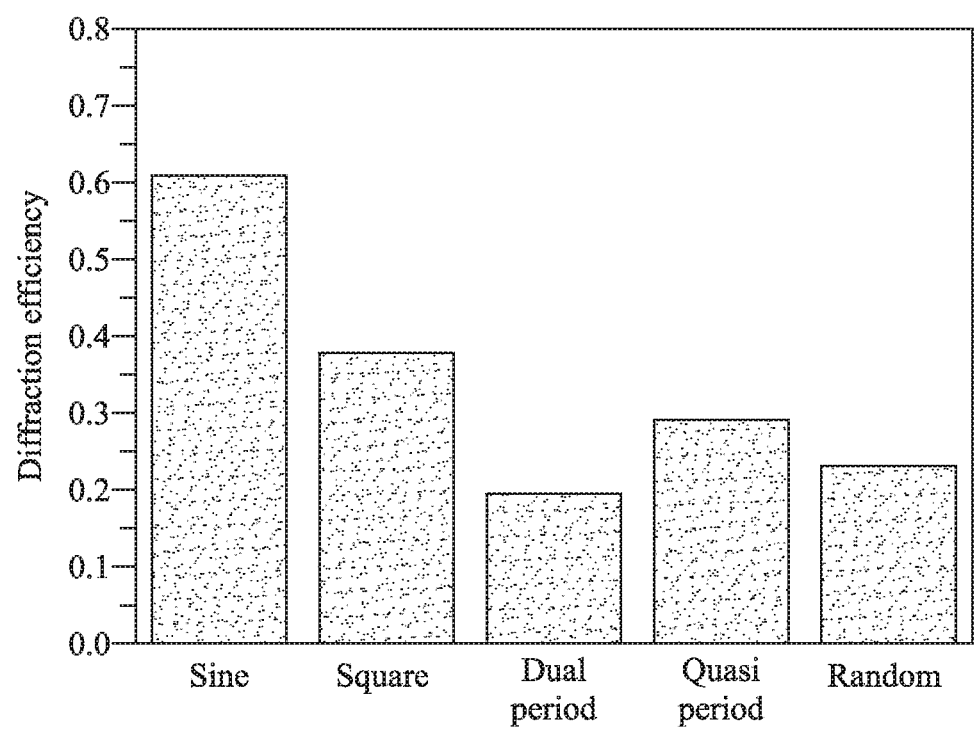
FIG. 5 is a chart illustrating examples of diffraction efficiency of a high-power fiber cladding power stripper based on the grating structure of FIGS. 4A to 4E.

FIG. 5 is a chart illustrating examples of diffraction efficiency of high-power fiber cladding power strippers based on the grating structure of FIGS. 4A to 4E. As shown in FIG. 5, the grating structures of FIGS. 4A-4E may achieve different diffraction efficiency, wherein the grating structure in a sinusoidal form has a maximum diffraction efficiency of about 60%, for example. However, the invention is not limited thereto.

In other embodiments, a high-power fiber cladding power stripper, e.g., based on the one shown in FIG. 1, may include the grating structure, in part or in whole, as shown in any one or any combination of FIGS. 4A to 4E. In yet other embodiments, a high-power fiber cladding power stripper, e.g., based on the one shown in FIG. 3, may include the grating structure with the grating sections in the same or different structural configuration, in part or in whole, as shown in any one or any combination of FIGS. 4A to 4E. In some embodiments, a high-power fiber cladding power stripper, e.g., based on the one shown in FIG. 3, may include the grating structure with the grating sections (two or more) with their respective refractive indexes varying from low to high, or from high to low, or in any sequence. In some embodiments, a high-power fiber cladding power stripper, e.g., based on the one shown in FIG. 3, may include the grating structure with the grating sections (two or more), arranged adjacent to each other, or spaced apart, along the cladding layer 220, wherein the grating sections may be periodic or non-periodic gratings, with their respective refractive indexes.

According to the invention, a periodic or non-periodic grating structure for directing abundant light energy by diffraction effects can be formed on the surface of an inner cladding layer of a fiber by application of one of photomask lithography method, dual beam interference technique, or direct laser writing technique, and so on. The refractive index of the periodic grating structure can be controlled by setting one or more manufacturing parameters, such as exposure time, so as to control the diffraction efficiency. In addition, the refractive index of the periodic grating structure can also be controlled by controlling one or more micro-nanometer structure parameters, such as period, structure depth, duty cycle, mixed periodic structure, and so on.

Alternatively, the refractive index of the periodic grating structure can also be controlled by selection of materials of the micro-nanometer grating structure. For example, a negative photoresist material (such as SU8 negative photoresist) having higher capability of withstanding power and melting point can be selected, which can withstand power density and temperature of about 80 W/cm² and 150° C. Further, the micro-nanometer grating structure can be manufactured by way of the technique of hydrogen-loaded optical fibers, for example.

While the invention has been described by way of specific embodiments, numerous modifications and variations could be made thereto by those skilled in the art without departing from the scope and spirit of the invention set forth in the claims.

What is claimed is:

1. A high-power fiber cladding power stripper, comprising:
    a core unit, which comprises an optical conductive material;
    a cladding layer, disposed outside the core unit, a refractive index of the cladding layer is lower than that of the core unit;
    a grating structure, disposed outside the cladding layer, for producing diffraction effects;
    a jacket, surrounding and protecting the core unit, the cladding layer, and the grating structure,
    wherein the grating structure is manufactured by using one of a dual beam interference technique and a direct laser writing technique,
    wherein the grating structure is in a sinusoidal form, at least in part.

2. The cladding power stripper according to claim 1, wherein the grating structure is a non-periodic grating structure.

3. The cladding power stripper according to claim 1, wherein the grating structure is a periodic grating structure or a periodically gradual grating structure.

4. The cladding power stripper according to claim 3, wherein the periodic grating structure or the periodically gradual grating structure has a period in a range of 0.5 μm to 3 μm.

5. The cladding power stripper according to claim 1, wherein the grating structure has a duty cycle in a range of 5% to 95%.

6. The cladding power stripper according to claim 1, wherein the grating structure has a height in a range of 0.5 μm to 200 μm.

7. The cladding power stripper according to claim 1, wherein the grating structure has a refractive index in a range of 1.3 to 1.7.

8. The cladding power stripper according to claim 1, wherein the grating structure is in a square form, at least in part.

9. The cladding power stripper according to claim 1, wherein the grating structure is a random form.

10. The cladding power stripper according to claim 1, wherein the grating structure comprises a plurality of grating sections arranged adjacent to each other along the cladding layer.

11. The cladding power stripper according to claim 1, wherein the grating structure comprises a plurality of grating sections spaced apart along the cladding layer.

* * * * *